(12) United States Patent
Hammond

(10) Patent No.: US 11,260,260 B2
(45) Date of Patent: Mar. 1, 2022

(54) WEIGHT-SUPPORTING APPARATUS, SYSTEM, AND METHOD OF USING THE SAME

(71) Applicant: Shedra Hammond, Smyrna, GA (US)

(72) Inventor: Shedra Hammond, Smyrna, GA (US)

(*) Notice: Subject to any disclaimer, the term of this patent is extended or adjusted under 35 U.S.C. 154(b) by 107 days.

(21) Appl. No.: 16/871,725

(22) Filed: May 11, 2020

(65) Prior Publication Data

US 2020/0353303 A1 Nov. 12, 2020

Related U.S. Application Data

(60) Provisional application No. 62/845,525, filed on May 9, 2019.

(51) Int. Cl.
*A63B 21/078* (2006.01)
*A63B 71/06* (2006.01)
*A63B 21/072* (2006.01)
*A63B 21/00* (2006.01)

(52) U.S. Cl.
CPC .......... *A63B 21/078* (2013.01); *A63B 21/072* (2013.01); *A63B 71/0619* (2013.01); *A63B 21/00047* (2013.01); *A63B 2071/065* (2013.01); *A63B 2071/0658* (2013.01); *A63B 2220/17* (2013.01); *A63B 2220/51* (2013.01); *A63B 2220/52* (2013.01); *A63B 2220/833* (2013.01); *A63B 2225/02* (2013.01); *A63B 2225/20* (2013.01); *A63B 2225/50* (2013.01)

(58) Field of Classification Search
CPC .......... A63B 21/072; A63B 21/00047; A63B 21/0722; A63B 21/0724; A63B 21/0726; A63B 21/0728; A63B 21/075; A63B 21/0783; A63B 21/4207; A63B 21/4029; A63B 71/0619; A63B 71/0622; A63B 2071/065; A63B 2071/0658; A63B 2220/17; A63B 2220/51; A63B 2220/52; A63B 2220/833; A63B 2225/02; A63B 17/00; A63B 17/02; A63B 17/04; G01G 19/52

See application file for complete search history.

(56) References Cited

U.S. PATENT DOCUMENTS

| | | | |
|---|---|---|---|
| 9,907,991 B2 | 3/2018 | Leipheimer | |
| 10,293,211 B2* | 5/2019 | Watterson | A63B 24/0087 |
| 11,110,316 B2* | 9/2021 | Sergakis | A63B 71/0036 |

(Continued)

*Primary Examiner* — Megan Anderson
(74) *Attorney, Agent, or Firm* — Alston & Bird LLP

(57) ABSTRACT

Exercise systems are provided that comprise at least a weight-supporting apparatus, the weight-supporting apparatus being configured for use with an upright exercise equipment apparatus and for at least one of receiving or supporting a weight-bearing component, an integrated scale and an integrated weight sensor, a digital display configured to at least display a weight data detected by the integrated scale and the integrated weight sensor, the weight data including at least an indication of a weight supported on the weight-supporting apparatus, a distributed network, and a server comprising a processor and one or more memory storage areas, the processor being configured to transmit the weight data over the distributed network to one or more remote devices, the one or more memory storage areas being configured to store the weight data on the server. A method of using an exercise system is also provided.

19 Claims, 13 Drawing Sheets

(56) References Cited

U.S. PATENT DOCUMENTS

| | | |
|---|---|---|
| 2015/0065316 A1 | 3/2015 | Towley, III et al. |
| 2015/0114916 A1 | 4/2015 | Tambornino et al. |
| 2017/0246490 A1 | 8/2017 | Hopperstad et al. |
| 2020/0023226 A1* | 1/2020 | Silveira .............. A63B 21/0626 |

* cited by examiner

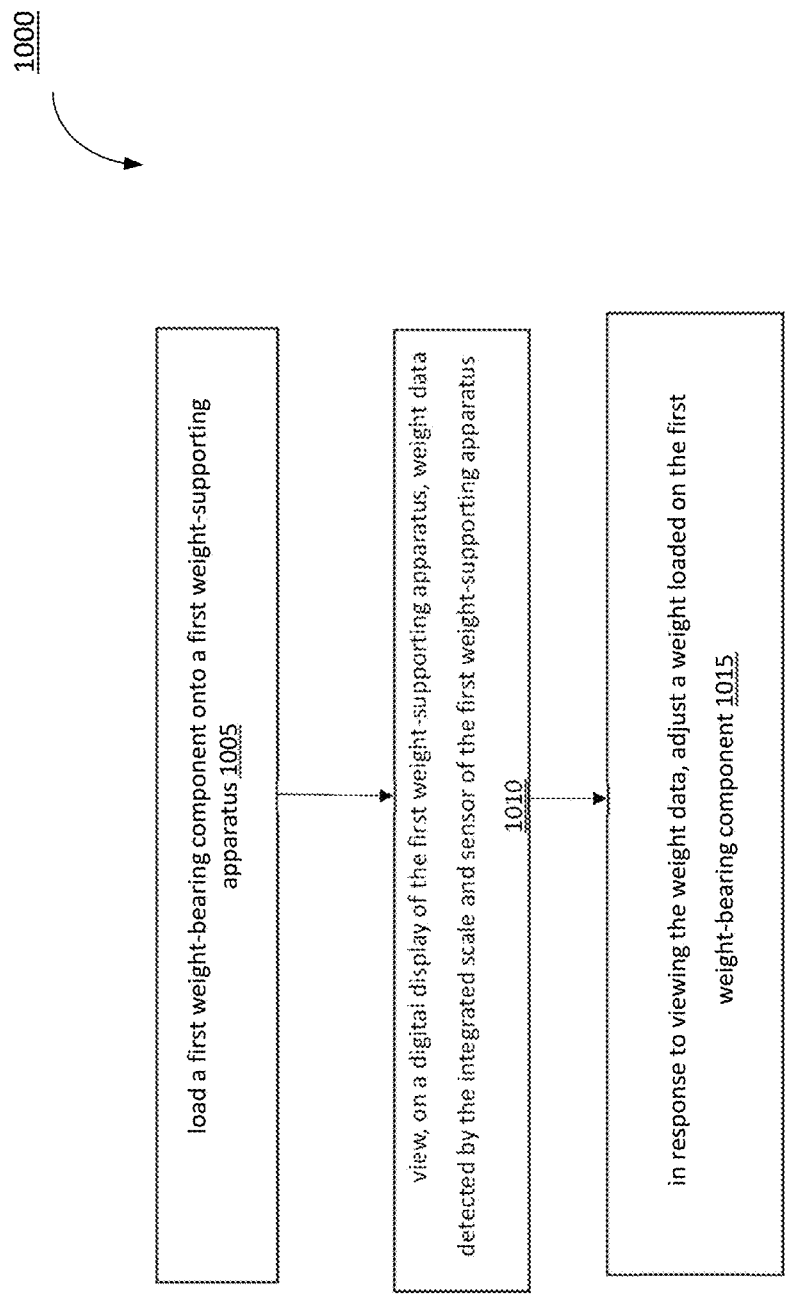

WEIGHT-SUPPORTING APPARATUS, SYSTEM, AND METHOD OF USING THE SAME

CROSS-REFERENCE TO RELATED APPLICATION

This application claims priority to and the benefit of U.S. Provisional Application No. 62/845,525, filed May 9, 2019, titled IMPROVED J-CUP AND METHOD OF USING THE SAME, the entire disclosure of which as is incorporated herein by reference in its entirety, including the Appendices included therewith.

BACKGROUND

Related Field

Various embodiments of the present invention relate generally to exercise equipment and apparatus. More specifically, the present invention relates to a weight-supporting apparatus enabling a user to visually track a fitness regimen.

Related Art

Various exercise equipment and apparatus are used to achieve fitness goals. For example, there are treadmills, rowing machines, stair-steppers, stationary bicycles and myriad other equipment and apparatus used during physical activity to enhance strength or conditioning effects. Generally speaking, such exercise equipment and apparatus can be categorized as being either cardiovascular ("cardio") equipment or strength equipment. On the one hand, cardio equipment is characterized as facilitating exercises that increase the heart rate and breathing rate. On the other hand, strength equipment is characterized as providing either fixed or adjustable amounts of resistance (i.e., weight) to facilitate exercises that develop the strength and size of the muscles. While beneficial to overall health, the use of weights in exercise is inherently dangerous. Therefore, strength equipment ordinarily comprises various components such as, for example, cables, pulleys, lifting straps, self-spotting devices, weight-supporting apparatuses and other mechanisms that facilitate safer use of weights in exercise. In that regard, FIG. 1 illustrates an exemplary conventional upright exercise equipment apparatus comprising a rail and pulley system. The vertical rails of the exemplary conventional upright exercise equipment apparatus engage and support a laterally configured weight-bearing component to be lifted by a user. The rails also act as guides, allowing the weight-bearing component, by action of the pulleys, to ascend and descend along the guides. This is designed to alleviate the need for assistance in weightlifting.

A J-Cup is one example of a weight supporting apparatus. A weight bar rests laterally upon the platform of one or more J-Cups (usually two). The J-Cup works against gravity to hold the weight bar above the ground. A J-Cup typically engages an upright exercise equipment apparatus (e.g., a squat rack, Smith machine, or other weight rack) to prevent heavy weights from falling and causing injury.

Despite the above-detailed configuration and advantages, weight-supporting apparatuses ordinarily suffer several deficiencies. First, weight-supporting apparatuses ordinarily provide no indication of how much weight is supported thereon. Thus, weight-supporting apparatuses ordinarily provide no preventive benefits toward preventing attempts to lift too much weight. Second, weight-supporting apparatuses ordinarily provide no preventive benefits toward preventing improper loading of weights. For example, weight-supporting apparatuses are ordinarily configured such that one can engage in lifting unevenly weighted—but fully supported—weight bearing components. Through applied effort, ingenuity, and innovation, applicant has solved one or more of these deficiencies and problems by developing solutions that are included in embodiments of the present disclosure, various examples of which are described in detail herein.

BRIEF SUMMARY

According to one aspect, an exercise system is provided. In various embodiments, the exercise system comprises a first weight-supporting apparatus. In certain embodiments, the first weight-supporting apparatus is configured for use with an upright exercise equipment apparatus and for at least one of receiving or supporting a weight-bearing component. In some embodiments, the exercise system comprises an integrated scale and integrated weight sensor. A digital display of these and other embodiments is configured to at least display weight data detected by the integrated scale and integrated weight sensor. The weight data of these and still other embodiments includes at least an indication of a weight supported on the weight-supporting apparatus. In these and still yet other embodiments, the exercise system comprises a distributed network. In embodiments, the exercise system comprises a server. The server of these and still yet other embodiments comprises a processor and one or more memory storage areas. The processor of these and still yet other embodiments is configured to transmit the weight data over the distributed network to one or more remote devices. The one or more memory storage areas of certain embodiments are configured to store the weight data on the server.

In various embodiments, the one or more remote devices are third-party devices configured for transmitting and receiving weight data over the network and display of said weight data.

In various embodiments, the weight-bearing component is chosen from the group consisting of a standard weight bar, an Olympic weightlifting bar, a trap bar, a yoke bar, a cambered bar, a Swiss bar, a curl bar, and a carry bar.

In various embodiments, the exercise system further comprises a second weight-supporting apparatus configured for use with an upright exercise equipment apparatus and for at least one of receiving or supporting a weight-bearing component.

In various embodiments, the first weight-supporting apparatus and the second weight-supporting apparatus are each removably engaged with a first upright exercise equipment apparatus so as to be positioned opposite one another relative to the first upright exercise equipment apparatus and to at least one of receive or support opposing ends of a weight-bearing component.

In various embodiments, the second weight-supporting apparatus further comprises an integrated scale and integrated weight sensor. In certain embodiments, a digital screen is configured to at least display weight data detected by the integrated scale and integrated weight sensor. In some embodiments, the weight data includes at least an indication of a weight supported on the weight-supporting apparatus.

In various embodiments, the weight data further comprises a weight change detected by the weight sensor of at least one weight-supporting apparatus.

In various embodiments, transmitting weight data comprises transmitting the weight change detected by the weight sensor of the at least one weight-supporting apparatus.

In various embodiments, receiving weight data comprises receiving by a remote device the weight change detected by the weight sensor of the at least one weight-supporting apparatus.

In various embodiments, the first weight-supporting apparatus and the second weight-supporting apparatus each further comprise means for transmitting and receiving weight data.

In various embodiments, transmitting weight data at least comprises transmitting, from the first weight-supporting apparatus to the second weight-supporting apparatus, weight data detected by the integrated scale and integrated sensor of the first weight-supporting apparatus.

In various embodiments, receiving weight data at least comprises receiving, by the second weight-supporting apparatus from the first weight-supporting apparatus, weight data detected by the integrated scale and integrated sensor of the first weight-supporting apparatus.

In various embodiments, the digital display of at least one of the first weight-supporting apparatus and the second weight-supporting apparatus is configured to display the total weight supported by both the first weight-supporting apparatus and the second weight-supporting apparatus.

In various embodiments, the exercise system further comprises user controls integrated with the scale of at least one weight-supporting apparatus. In embodiments, the user controls are configured to permit user calibration of the scale prior to placement of any weight upon the weight-bearing component.

According to one aspect a method of using the exercise system is provided. In various embodiments, the method comprises the step of loading a first weight-bearing component onto a first weight-supporting apparatus. In certain embodiments, the method further comprises viewing, on a digital display of the first weight-supporting apparatus, weight data detected by the integrated scale and integrated sensor of the first weight-supporting apparatus. In some embodiments, the method further comprises in response to viewing the weight data, adjusting a weight loaded on the first weight-bearing component.

In various embodiments, the method further comprises prior to loading the first weight-bearing component onto the first weight-supporting apparatus, calibrating the first weight-supporting apparatus for a first user. In certain embodiments, calibrating comprises confirming that the digital display of the first weight-supporting apparatus displays a zero weight in an un-loaded state. In some embodiments, calibrating comprises interacting with a user control of the integrated scale of the first weight-supporting apparatus to adjust the digital display so that it displays a zero weight in an un-loaded state.

In various embodiments, the method further comprises prior to loading the first weight-bearing component onto the first weight-supporting apparatus, engaging the first weight-supporting apparatus with an upright exercise equipment apparatus so as to facilitate at least one of receiving or supporting a weight-bearing component by the first weight-supporting apparatus. In certain embodiments, the method further comprises providing user input to a remote device. In some embodiments, the method further comprises viewing weight data on a digital display of the weight-supporting apparatus in response to providing the user input. In these and other embodiments, the method further comprises unloading the first weight-bearing component from the weight-supporting apparatus. In these and still other embodiments, the method further comprises loading a second weight-bearing component onto the weight-supporting apparatus. In these and yet still other embodiments, the method further comprises in response to loading a second weight-bearing component onto the weight-supporting apparatus, viewing weight data on a digital display of the weight-supporting apparatus.

In various embodiments, the method further comprises receiving, at a remote device, the weight data associated with the first weight-bearing component and the second weight-bearing component. In certain embodiments, the method further comprises unloading the second weight-bearing component from the weight-supporting apparatus. In these and other embodiments, the method further comprises disengaging the weight-supporting apparatus from the upright exercise equipment.

In various embodiments of the method, the weight-supporting apparatus comprises a single J-Cup assembly.

In various embodiments of the method, the weight-supporting apparatus comprises a pair of J-Cup assemblies.

In various embodiments, one of the weight-supporting apparatus and the second weight-supporting apparatus further comprises a component for transmitting and receiving data.

BRIEF DESCRIPTION OF THE SEVERAL VIEWS OF THE DRAWINGS

Figure 1:
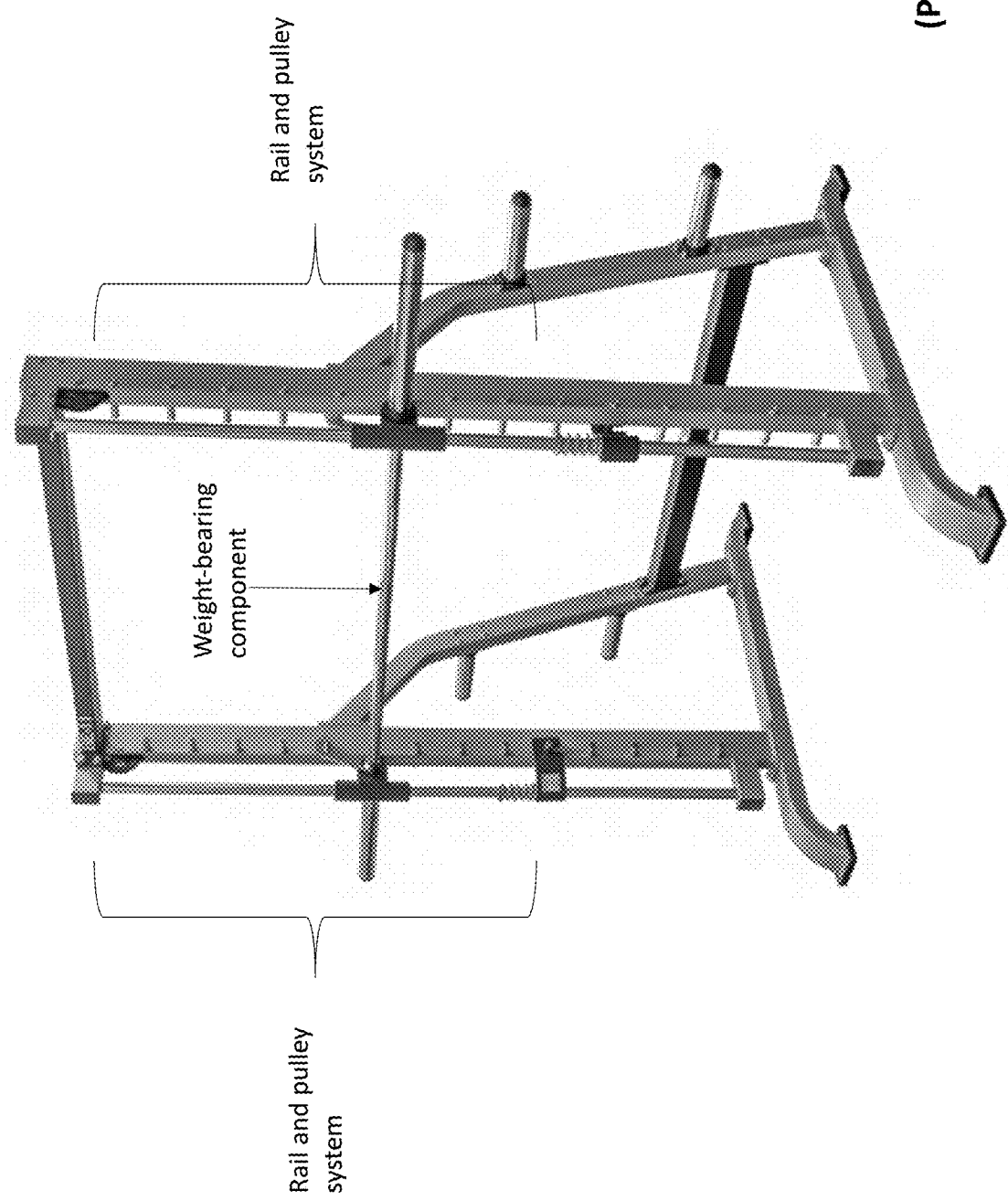
Figure 2:
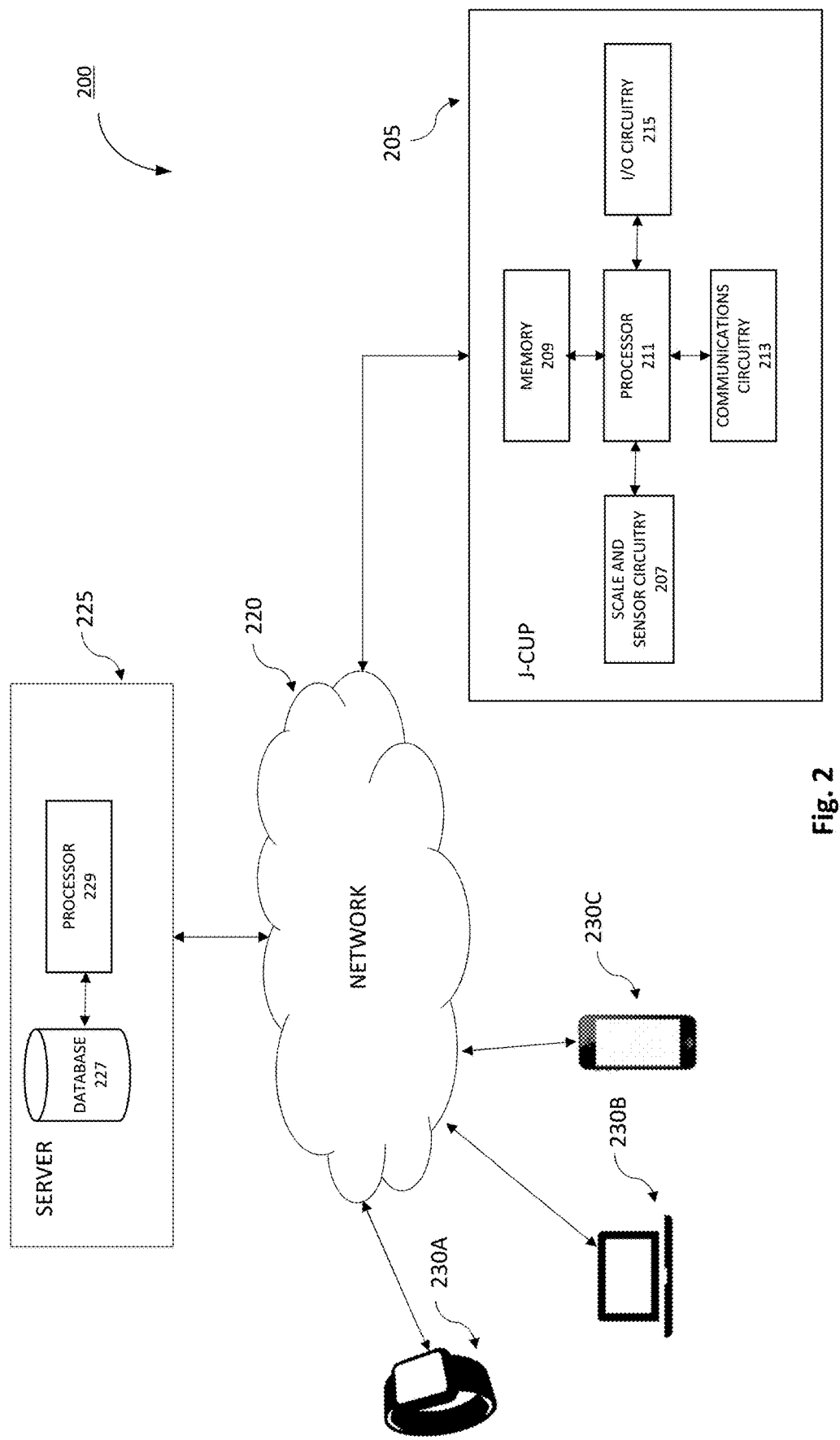
Figure 3:
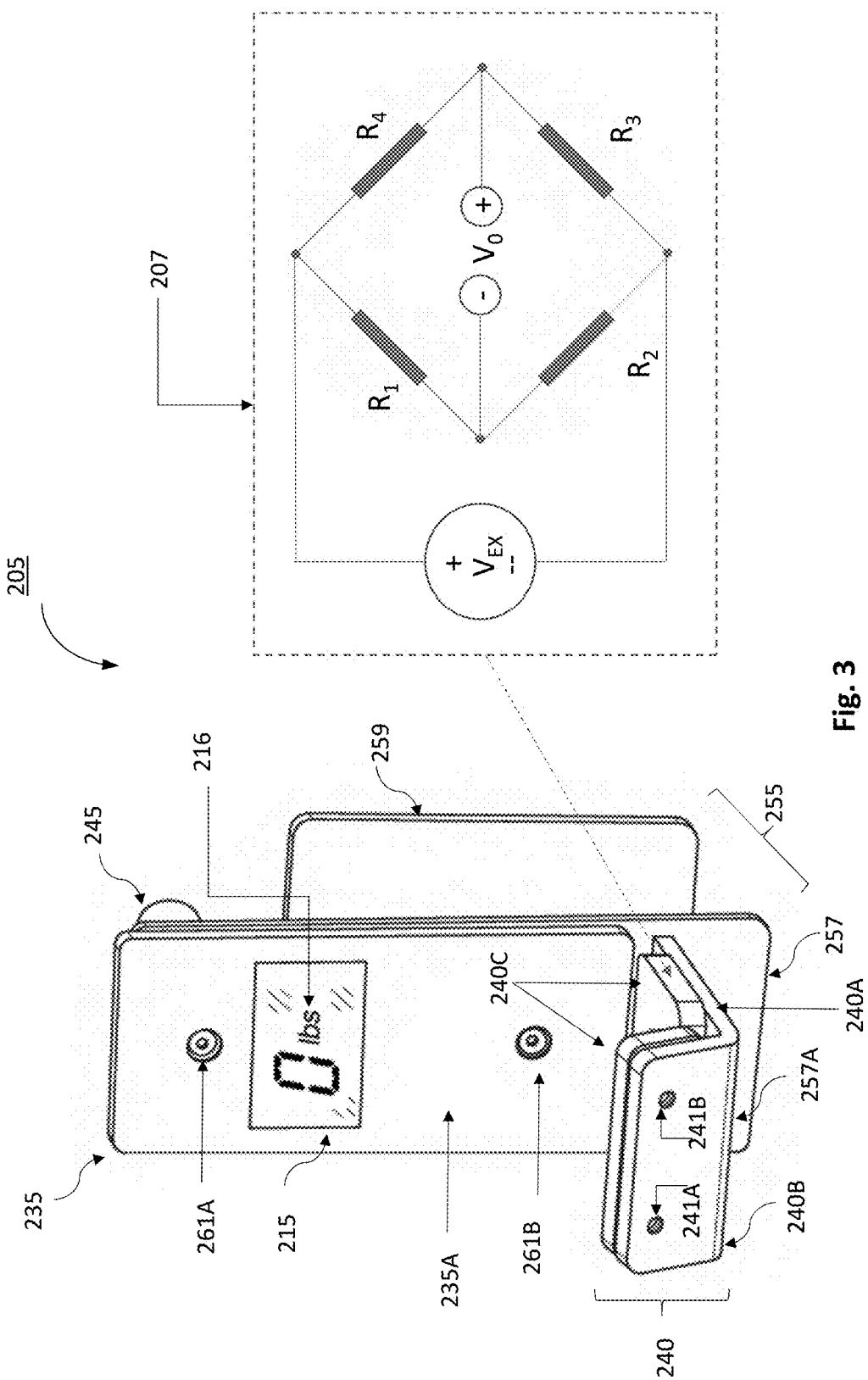
Figure 4:
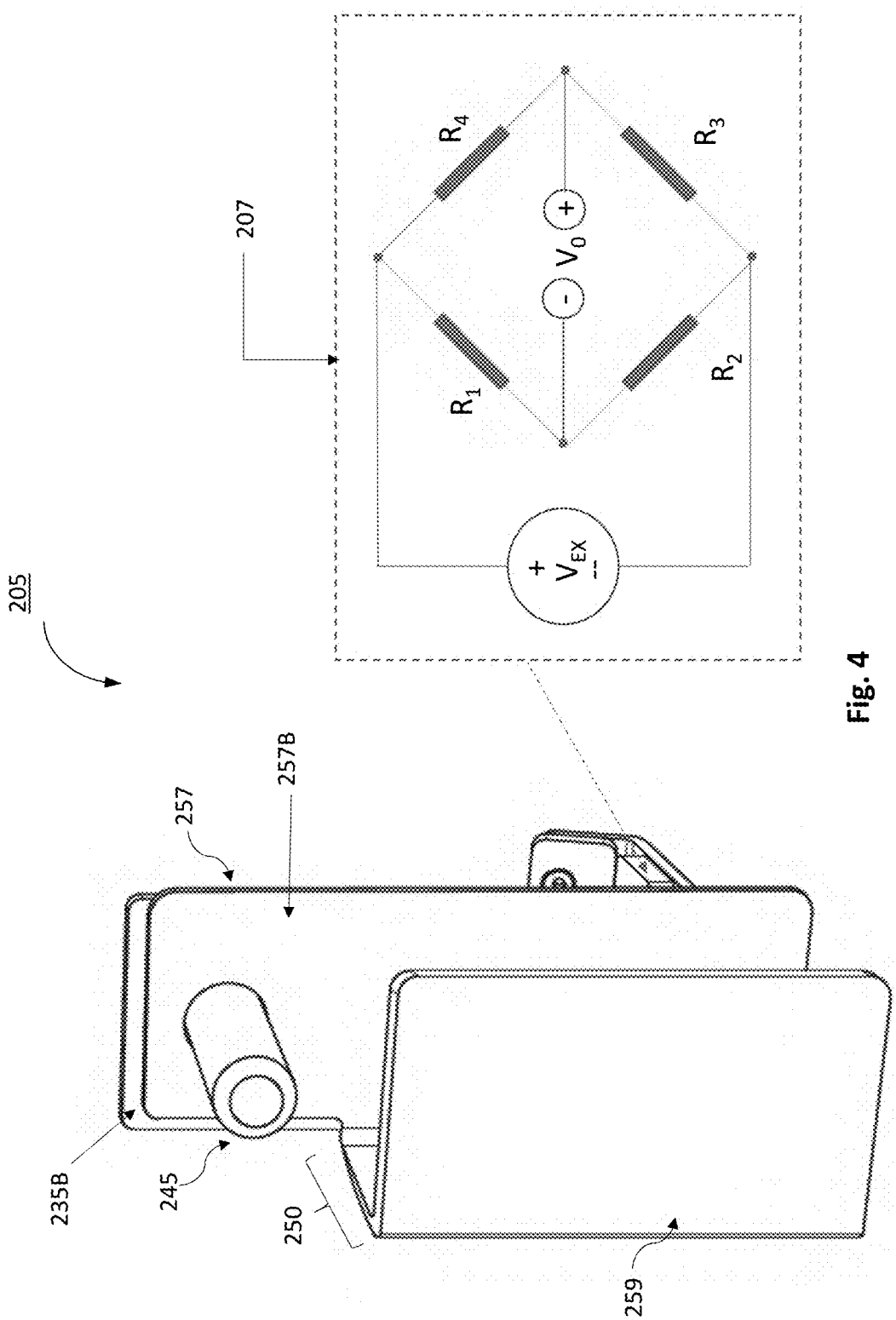
Figure 5:
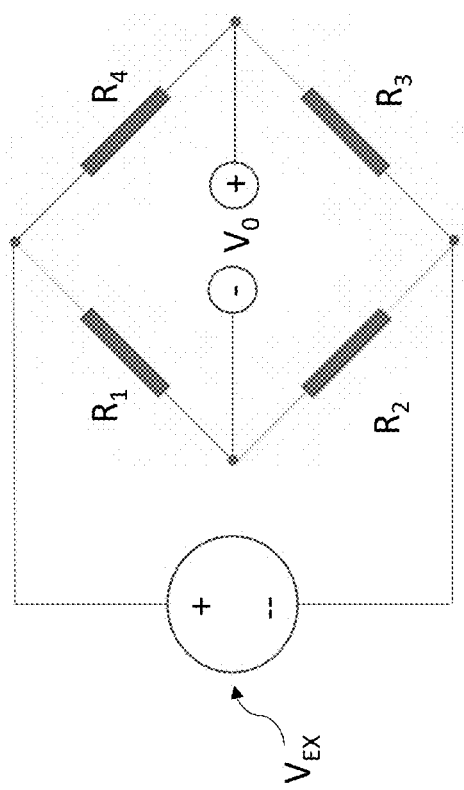
Figure 6:
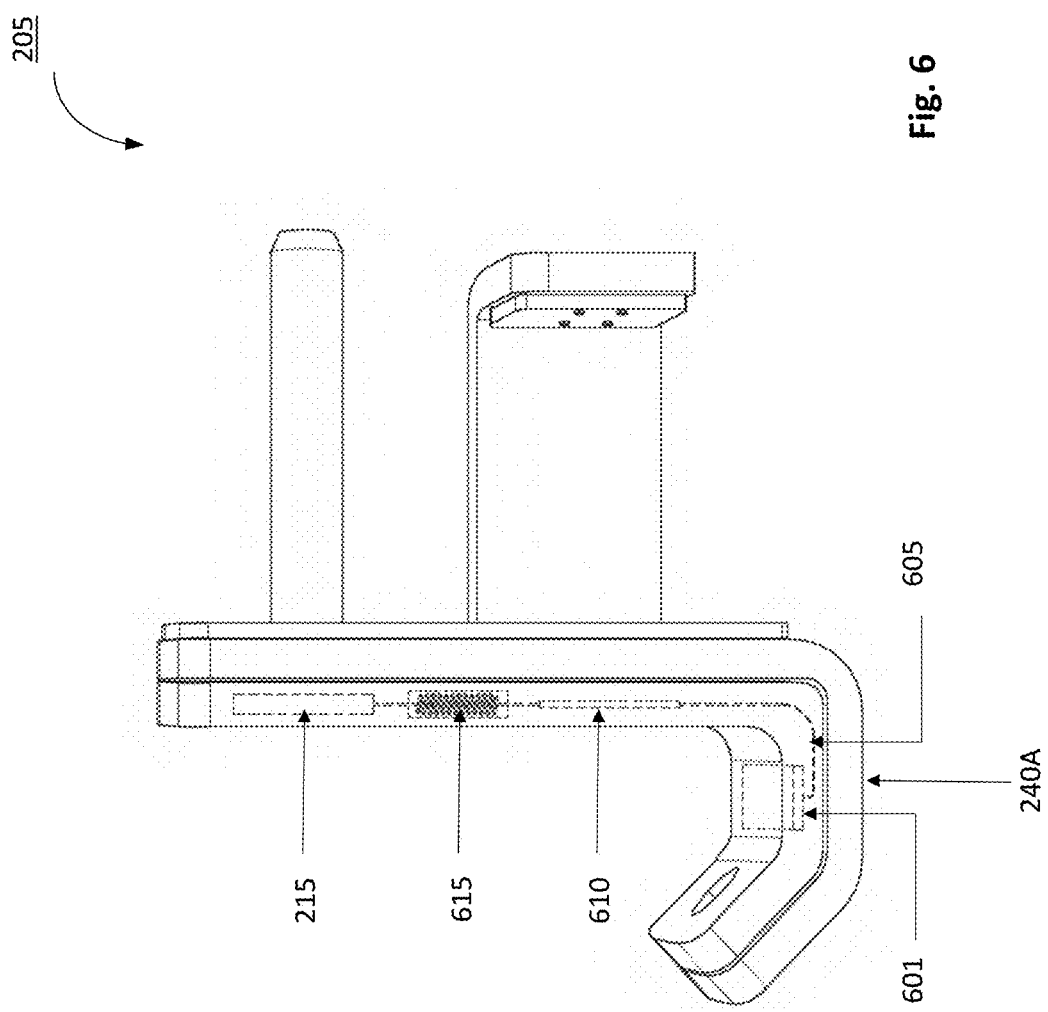
Figure 7:
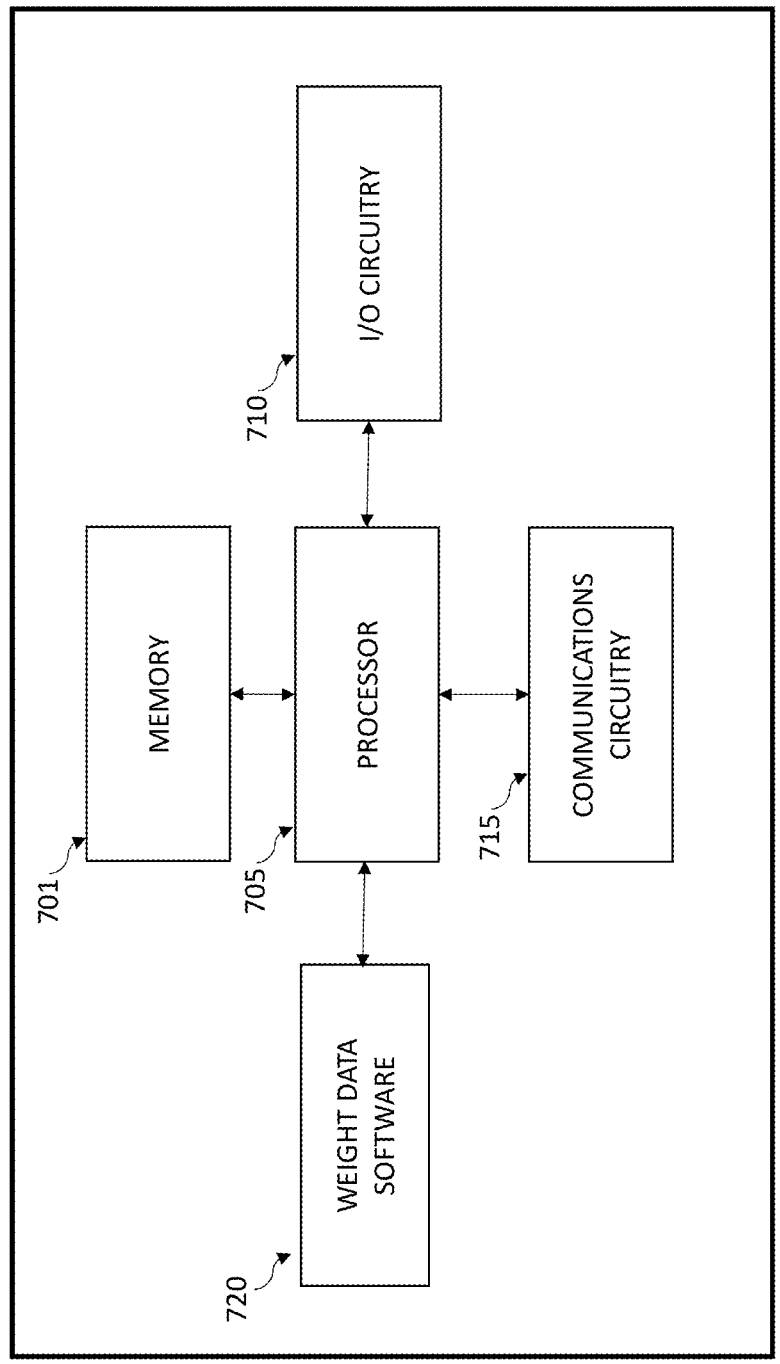
Figure 8:
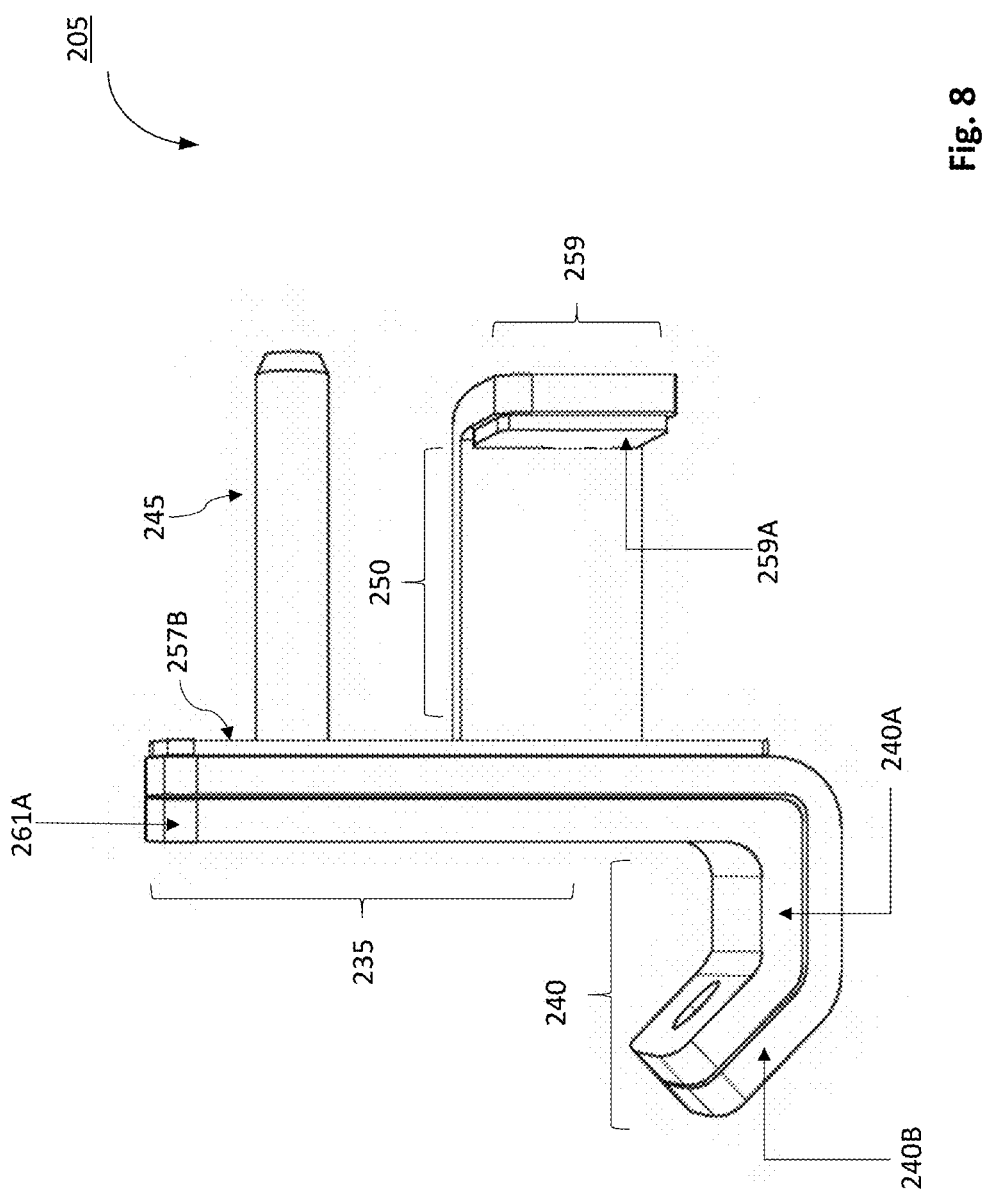
Figure 9B:
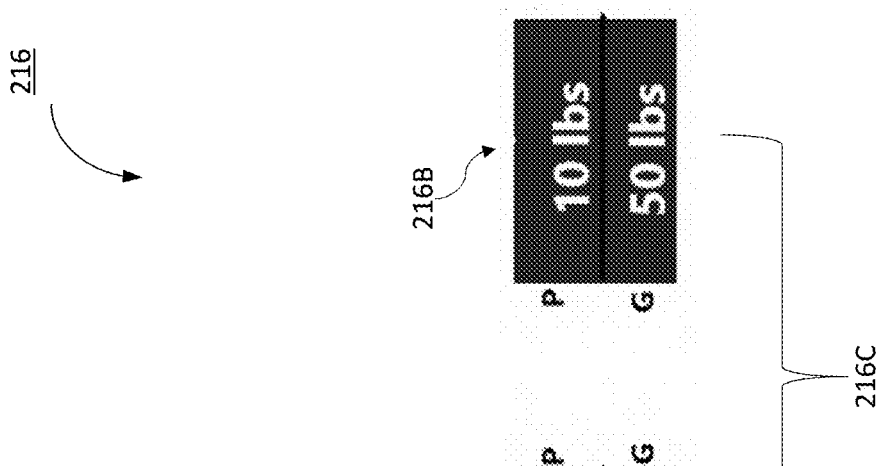
Figure 9A:
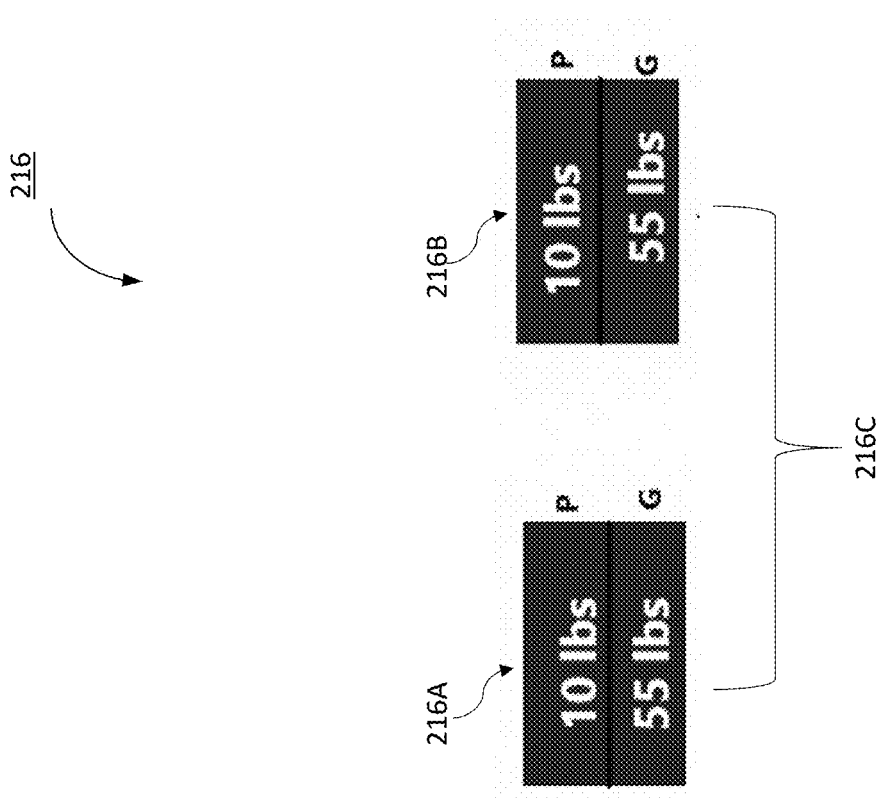
Figure 11:
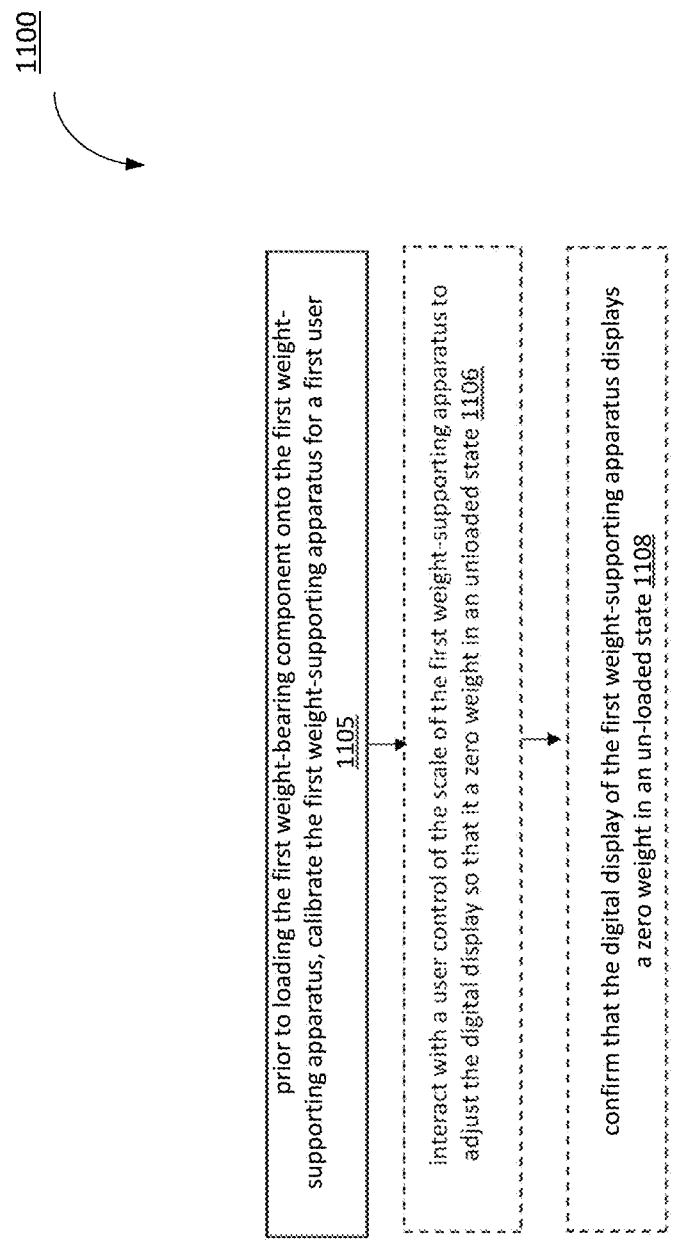
Figure 12:
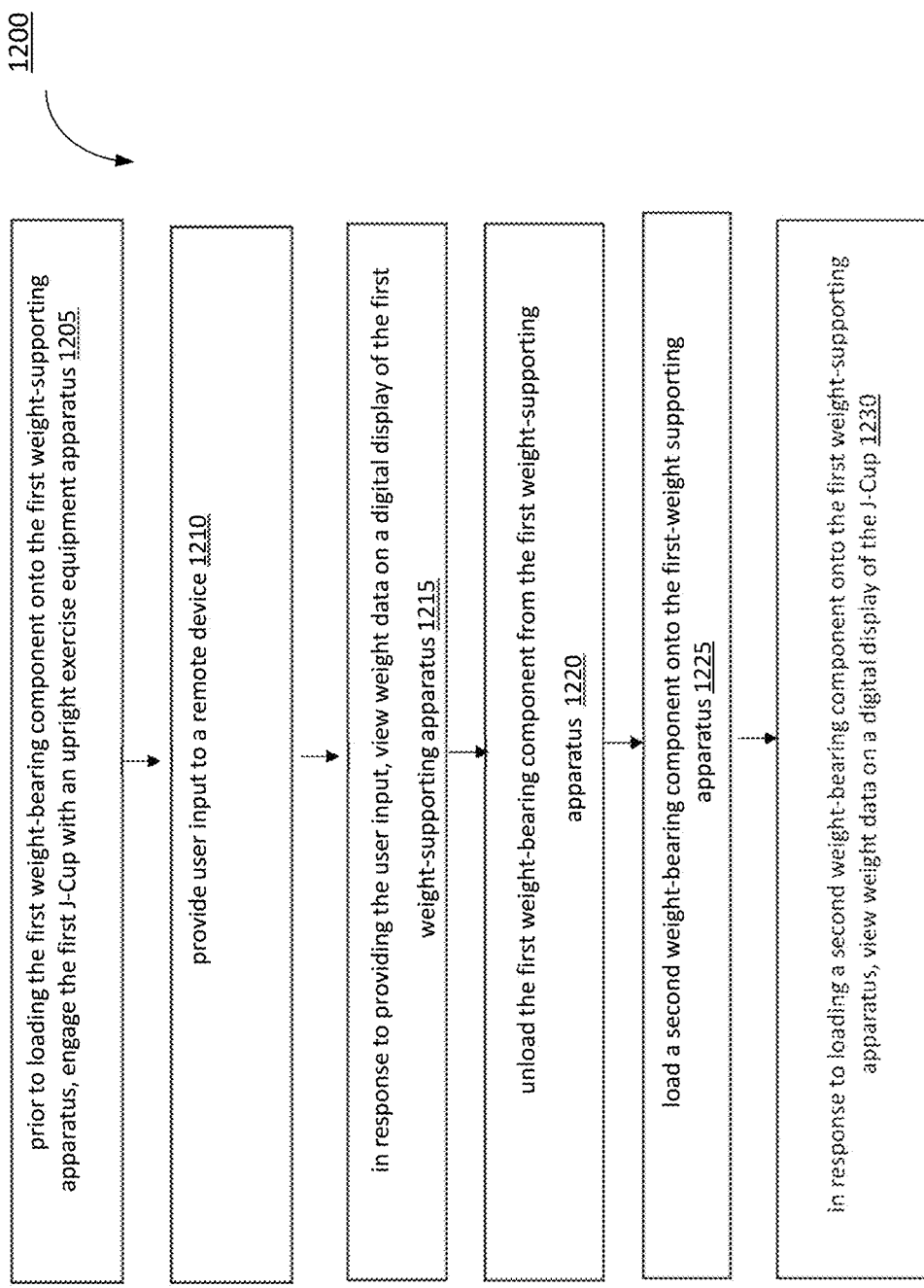
Figure 13:
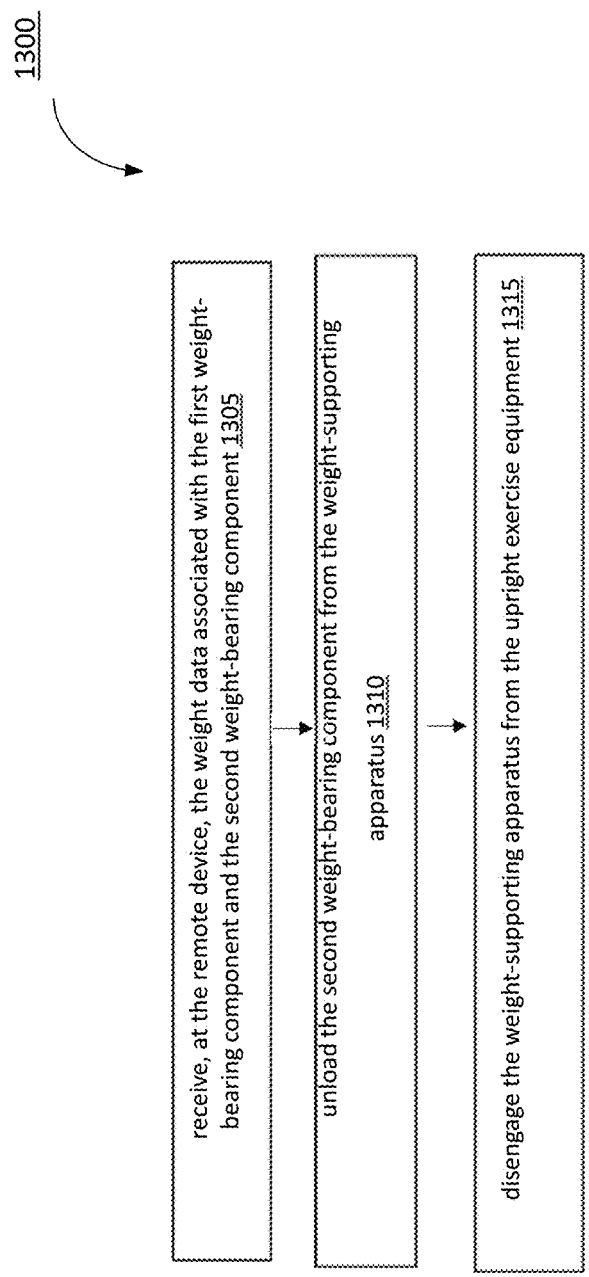

Having thus described some embodiments in general terms, reference will now be made to the accompanying drawings, which are not necessarily drawn to scale and wherein:

FIG. 1 is a perspective view illustrating an exemplary conventional upright exercise equipment apparatus comprising a rail and pulley system;

FIG. 2 is an exemplary system architecture diagram configured to practice embodiments of the present disclosure;

FIG. 3 is a front perspective view of an un-loaded weight-supporting apparatus structured according to embodiments of the present disclosure;

FIG. 4 is a rear perspective view of an un-loaded weight-supporting apparatus structured according to embodiments of the present disclosure;

FIG. 5 is a schematic diagram of scale and sensor circuitry according to embodiments of the present disclosure;

FIG. 6 is a right perspective view of an un-loaded weight-supporting apparatus illustrating how scale and sensor circuitry that is otherwise not visible in other drawings may be embedded therein according to embodiments of the present disclosure;

FIG. 7 is an exemplary schematic diagram of a remote device according to embodiments of the present disclosure;

FIG. 8 is a right perspective view of an un-loaded weight-supporting apparatus structured according to embodiments of the present disclosure;

FIG. 9A illustrates net weight data and total weight data for a properly loaded weight-supporting apparatus according to embodiments of the present disclosure;

FIG. 9B illustrates net weight data and total weight data for an improperly loaded weight-supporting apparatus according to embodiments of the present disclosure;

FIG. 10 is a flowchart illustrating example operations for loading a first weight-bearing component onto a first weight-supporting apparatus according to embodiments of the present disclosure;

FIG. 11 is a flowchart illustrating example operations for calibrating a weight-supporting apparatus according to embodiments of the present disclosure;

FIG. 12 is a flowchart illustrating example operations for engaging a first weight-supporting component with an upright exercise equipment apparatus;

FIG. 13 is a flowchart illustrating example operations for receiving weight data associated with a first a first weight-bearing component and a second weight-bearing component according to embodiments of the present disclosure.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments of the invention generally relate to an exercise system comprising a weight-supporting apparatus and a distributed network that enable visual tracking of an exercise regimen and support multiple different users. Moreover, different users of an exercise system may vary in strength and overall fitness, and therefore may engage in various exercises of differing difficulty and weight resistance than do other users. It is therefore particularly desirable to ensure precise detection and display of the weight used and repetitions completed by each user as workout regimens vary in intensity and/or number of users.

Multiple users often share exercise equipment. In fact, such a paradigm is the key aspect of the business model of gyms. For example, consider a gym set in California at which two exercise system users, Karen and Kelly, are members. Karen and Kelly share a piece of upright exercise equipment by taking turns performing a given number of bench press repetitions. Thus, one or more weight-supporting apparatuses are engaged with the upright exercise equipment to receive and/or support opposing ends of a weight bar as Karen and Kelly perform their bench press repetitions.

In some circumstances, Karen and Kelly may perform the same bench press regimen. For example, Karen and Kelly may be teammates performing an exercise regimen that the entire team performs. Karen performs 10 bench press repetitions at 100 lbs., and Kelly follows suit. Karen and Kelly alternate using the exercise equipment until both have completed an exercise regimen of 3 sets of 10 bench press repetitions at 100 lbs. In another example, Kelly may be a novice and Karen may be Kelly's personal trainer. Karen thus demonstrates to Kelly how to perform the bench press regimen.

In some other circumstances, Karen and Kelly may perform different exercise regimens. For example, Karen and Kelly may have no other familiarity with one another besides presently sharing a piece of exercise equipment. Moreover, Karen and Kelly may each be seasoned athletes using the exercise equipment to perform vigorous and distinct exercises. In this example, Karen may perform an exercise regimen consisting of bench press, shoulder press, and shoulder shrugs. However, Kelly alternates use of the exercise equipment with Karen and performs a regimen consisting only of squats.

Various embodiments discussed herein are configured to detect and display weight data so that users can efficiently and reliably track the amount of weight lifted and number of repetitions performed during an exercise regimen. In one embodiment, the weight-supporting apparatus (more precisely, the integrated scale and integrated weight sensor of the weight-supporting apparatus) detects the total weight on/supported by the weight-supporting apparatus. This weight is stored to the storage area of a server. A processor associated with the server transmits the weight to remote devices. In other embodiments, the weight sensor of the weight-supporting apparatus detects a weight change in the weight on/supported by the weight-supporting apparatus. Likewise, this weight change is stored to the storage area of the server. The processor associated with the server transmits the weight change to remote devices. In still further embodiments, weight data detected by the weight sensor of a weight-supporting apparatus is transmitted to a second weight-supporting apparatus. The weight data is stored to the storage area of the server. The processor associated with the server transmits the weight data to the second weight-supporting apparatus.

Weight-supporting apparatuses according to the present disclosure are configured to detect weight data and changes therein. For example, returning to the scenario wherein Karen and Kelly are performing different exercise regimens, let's consider for illustration purposes that Kelly is performing sets of 5 squats at 205 lbs. However, Karen is not strong enough to perform any of her exercises with this weight. Thus, in one embodiment, the weight-supporting apparatus is configured to display to Karen that a total weight of 205 lbs. is loaded on the weight-supporting apparatus. Hence, the weight-supporting apparatus displays to Karen that too much weight for her to lift is loaded. Weight-supporting apparatuses configured according to the present disclosure therefore provide improved exercise tracking and safety protocols by visually displaying pertinent weight data.

In an exemplary embodiment, the exercise system is configured to transmit the weight data indicating the total weight supported by the weight-supporting apparatus to a remote device such as a smartwatch. For example, in certain embodiments, it is not necessary for either Karen or Kelly to be in the immediate vicinity of the exercise equipment while the other exercises. The exercise system stores the weight detected by the weight-supporting apparatus and transmits the same so that Karen and Kelly can keep track of how much weight is on the bar before commencing to lift. For example, Karen may take a water break and leave the immediate vicinity of the exercise equipment. The exercise system in at least the embodiments described herein is configured to transmit the total weight loaded on the bar to Karen's smartwatch. Thus, Karen may receive a notification on her smartwatch that indicates that more weight than she can lift is loaded, thereby mitigating the chances of injury.

In still other example embodiments, the exercise system is configured to store and transmit workout data detected by a weight-supporting apparatus to a remote device. For example, workout data may comprise data indicating a number of sets of exercise repetitions completed with a given amount of weight. In our earlier example, Kelly is performing sets of 5 repetitions of squats with 205 lbs. Thus, weight-supporting apparatuses of the example embodiment are configured to detect the frequent loading and unloading of 205 lbs. with relatively little time lapse therebetween and interpret the same as a repetition.

FIG. 1 is a perspective view illustrating an exemplary conventional upright exercise equipment apparatus comprising a rail and pulley system. The rail and pulley system is used to obviate the need for a "spotter" or assistant to support an exerciser when lifting weights. Nonetheless, ordinary weight-supporting apparatuses such as the depicted rail and pulley systems provide no visual indication of weight data for safety and tracking purposes.

Exemplary System Architecture

FIG. 2 is an architecture diagram of an exercise system 200 ("the system") configured to practice embodiments of the present disclosure. The system 200 comprises weight-supporting apparatus 205, network 220, server 225, and remote devices 230A-C. Furthermore, in the embodiment shown weight-supporting apparatus 205 comprises several elements including scale and sensor circuitry 207, memory 209, processor 211, communications circuitry 213, and input/output ("I/O") circuitry 215. The depicted system 200 is configured to detect, store, transmit and display weight data during exercise to enable users to accurately and safely manage their exercise regimens. Each element of the system 200 is discussed in turn.

Weight-supporting apparatus 205 includes scale and sensor circuitry 207, memory 209, processor 211, communications circuitry 213, and input/output ("I/O") circuitry 215. In some embodiments, the processor 211 (and/or co-processor or any other processing circuitry assisting or otherwise associated with the processor) may be in communication with the memory 209 via a bus for passing information among components of the weight-supporting apparatus 205. The memory 209 may be non-transitory and may include, for example, one or more volatile and/or non-volatile memories. In other words, for example, the memory 209 may be an electronic storage device (e.g., a computer readable storage medium). The memory 209 may be configured to store information, data, content, applications, instructions, or the like, for enabling the weight-supporting apparatus 205 to carry out various functions in accordance with example embodiments of the present disclosure. In one example, the memory 209 is configured to serve as a local cache for weight data associated with various users. In this regard, memory 209 is configured as a local weight data repository.

The processor 211 may be embodied in a number of different ways and may, for example, include one or more processing devices configured to perform independently. Additionally, or alternatively, the processor 211 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 211 may be configured to execute instructions stored in the memory 209 or otherwise accessible to the processor 211. Alternatively, or additionally, the processor 211 may be configured to execute hard-coded functionality. As such, whether configured by hardware or software methods, or by a combination thereof, the processor 211 may represent an entity (e.g., physically embodied in circuitry) capable of performing operations according to an embodiment of the present disclosure while configured accordingly. Alternatively, as another example, when the processor 211 is embodied as an executor of software instructions, the instructions may specifically configure the processor 211 to perform the algorithms and/or operations described herein when the instructions are executed.

The depicted weight-supporting apparatus 205 includes input/output circuitry 215 that may, in turn, be disposed in communication with processor 211 to provide output to another weight-supporting apparatus 205, to one or more remote devices and, in some embodiments, to receive an indication of a user input. In some embodiments, input/output circuitry 215 is configured to receive various user input via associated remote devices within the distributed network. In some embodiments, the user input comprises data sent to the input/output circuitry 215 to accomplish calibration of the scale and sensor circuitry 207. In other embodiments, the user input comprises workout data sent to the input/output circuitry 215 to initiate or terminate a "workout session." For example, user input may comprise commands In some embodiments, the scale and sensor circuitry 207 is configured to detect and log weight data and workout data such as a number of repetitions performed for various users. The input/output circuitry 215 may comprise a user interface including a display, and may comprise a web user interface, a mobile application, a remote device, or the like. In some embodiments, the input/output circuitry 215 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 209, and/or the like).

The communications circuitry 213 may be any means such as a device or circuitry embodied in either hardware or a combination of hardware and software that is configured to receive and/or transmit data from/to a network and/or any other device, circuitry, or module in communication with the weight-supporting apparatus 205. In this regard, the communications circuitry 213 may include, for example, a network interface for enabling communications with a wired or wireless communication network. For example, the communications circuitry 213 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The scale and sensor circuitry 207 may be any means such as a device or circuitry combined in either hardware or a combination of hardware and software that is configured to detect, store, analyze or otherwise process, and transmit weight data and workout data. In some embodiments, the scale and sensor circuitry 207 is further configured to combine various weight data files in order to generate total weight data or net weight data.

Remote devices 230A, 230B, 230C access server 225 over a network 220. A user of the exercise system 200 may request, via a remote device 230A, 230B, 230C, access to weight data detected by one or more weight-supporting apparatuses of the system 200. More particularly, the server 225 receives weight data requests from the remote devices 230A, 230B, 230C via network 220. In response to receiving a weight data request, server 225 is configured to access its native database 227 to retrieve and provide the requested weight data to remote devices 230A, 230B, 230C.

Network 220 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 220 may include a cellular telephone, an 802.11, 802.16, 802.20, and/or WiMax network. Further, network 220 may include a public network, such as the Internet, a private network, such as an intranet, or combinations thereof, and may utilize a variety of networking protocols now available or later developed including, but not limited to TCP/IP based networking protocols. In example embodiments, network 220 supports many users by providing mutual access to internet-based features. Thus, network 220 is configured to provide access to weight data and workout data of individuals or multiple users on a website or mobile app.

The database 227 may be embodied as data storage devices such as a Network Attached Storage (NAS) device, or as separate database servers. The database 227 includes information accessed and stored by the server 225 to facilitate operations of the system 200. For example, the server 225 may fetch and aggregate weight data files pertaining to weight amounts used during exercise over regional network 220.

Exemplary Weight-Supporting Apparatus

FIG. 3 is a front perspective view of an un-loaded weight-supporting apparatus structured according to embodiments of the present disclosure. The depicted weight-supporting apparatus 205 (i.e., a J-Cup) comprises a front planar portion 235, a platform 240, an engaging component 245, a rear supporting portion distal arm 250 (not shown) and a rear supporting portion 255. The front planar portion 235 further comprises an anterior side 235A and a posterior side 235B (not shown). The front planar portion 235 defines a substantially planar surface having a substantially larger length in a longitudinal dimension than in a latitudinal dimension. Front planar portion 235 comprises planar portion receiving means 260A (not shown) and planar portion receiving means 260B (not shown) configured to engage, affix, or otherwise mechanically couple the front planar portion 235 to the rear supporting portion 255. In the depicted embodiment, planar portion receiving means 260A (not shown) and planar portion receiving means 260B (not shown) are each disposed near to a medial axis of anterior side 235A. Planar portion receiving means 260A (not shown) is disposed nearer to a cranial aspect of the front planar portion 235. Planar portion receiving means 260B (not shown) is disposed nearer to a caudal aspect of front planar portion 235. However, weight-supporting apparatuses 205 according to the present disclosure may be otherwise configured. For example, front planar portion 235 may comprise only one or a plurality of planar portion receiving means. Moreover, any or all of planar portion receiving means may be disposed nearer to a medial aspect of front planar portion 235, or nearer to a lateral aspect thereof. Planar portion receiving means 260A (not shown) and planar portion receiving means 260B (not shown) are configured to receive planar portion fastening means 261A and planar portion fastening means 261B, respectively. Planar portion fastening means 261A and planar portion 261B may be any means such as nuts and bolts, screws, anchors, pins and rivets, and the like which are suitable for firmly attaching and securing in place front planar portion 235 to rear supporting portion 255.

In the depicted embodiment, input/output circuitry 215 comprises a digital display embedded in, affixed on, or otherwise disposed upon the anterior side 235A. In the depicted embodiment, input/output circuitry 215 (i.e., the digital display) is configured near to a superior aspect of the front planar portion 235, disposed between front planar receiving means 260A (not shown) and front planar receiving means 260B. However, input/output circuitry may be configured in various dispositions thereon front planar portion 235, including but not limited to being configured near to an inferior aspect of the front planar portion 235 and being configured near to a medial aspect of front planar portion 235. The digital display of the un-loaded weight-supporting apparatus 205 displays a zero weight (e.g., 0 lbs.), visually indicating an un-loaded configuration of the weight-supporting apparatus 205. The digital display may be configured to visually indicate weight data 216 in a variety of appropriate weight units, including but not limited to pounds, ounces, grams, kilograms, newtons, or the like. In some embodiments, input/output circuitry 215 further comprises a touchscreen. In embodiments when input/output circuitry 215 further comprises a touchscreen, the scale and sensor circuitry 207 is configured to respond to an indication of user input by, for example, calibrating the scale and digital display to show weight data indicative of a zero-value weight.

The depicted rear supporting portion 255 comprises an engaging component 245, a rear supporting portion first face 257, a rear supporting portion second face 259, and a rear supporting portion rear supporting portion distal arm 250 (not shown). The rear supporting portion first face 257 further comprises an anterior side 257A and a posterior side 257B (not shown). In the depicted embodiment, the platform 240 is configured near to an inferior aspect of the anterior side 257A. The depicted platform 240 extends transversely from the anterior side 257A, in a substantially upwardly jutting configuration. The platform 240 comprises a platform landing portion 240A and a platform securing portion 240B. The platform 240 is configured to receive and/or support a weight-bearing component (not shown). A weight-bearing component is thus received at and/or supported on the platform landing portion 240A and is secured against falling therefrom by the platform securing portion 240B. In the depicted embodiment, the platform securing portion 240B defines a leg of the platform 240 extending upwardly from the platform landing portion 240A at substantially obtuse angle. However, the platform securing portion 240B may be configured so as to define other vertical angles in relation to the platform landing portion 240A.

For example, the platform securing portion 240B may be configured so as to define any angle in a preferred range of 30° to 120°. In the depicted embodiment, the platform comprises a platform auxiliary support component 240C. The depicted platform auxiliary support component 240C is configured as a monolith, i.e., as comprising a single material configured into relative portions. However, the platform auxiliary support component 240C may be configured as a plurality of auxiliary support components embodied as pads, cushions, bolsters or the like. The platform securing portion 240B comprises auxiliary support receiving means 241A and auxiliary support receiving means 241B for fastening or otherwise securing the auxiliary support component 240C to the platform 240. In the depicted embodiment, auxiliary support receiving means are voids or female receptacles configured to receive auxiliary support engaging means (not shown). The depicted platform securing portion 240B defines a planar slope on which auxiliary support receiving means 241A and auxiliary support receiving means 241B are disposed. Further, platform auxiliary support component 240C is configured to house, contain, incorporate, or otherwise include scale and sensor circuitry 207 as discussed in further detail below with reference to FIG. 6.

FIG. 4 is a rear perspective view of an un-loaded weight-supporting apparatus structured according to embodiments of the present disclosure. In the depicted embodiment, engaging component 245 is shown extending transversely from and nearer to a superior aspect of the posterior side 257B relative to the rear supporting portion distal arm 250. The depicted engaging component 245 is a substantially cylindrical shaft configured to help secure the weight-supporting apparatus 205 to an upright exercise equipment apparatus. For example, the depicted engaging component 245 may interface with a female connector such as a receptacle of an upright exercise equipment apparatus that is designed to accept a male connector. However, the engaging component 245 may be configured alternatively, for example, as a mechanical fastener such as a clevis and clevis pin, cotter pin, spiral pin, slotted pin, split pin, spring pin or the like.

The depicted rear supporting portion second face 259 and rear supporting portion distal arm 250 define a substantially l-shaped arm configured to surround, engage or otherwise accommodate a framework of an upright exercise equipment apparatus. The rear supporting portion second face 259 defines a substantially planar surface having a larger length in a longitudinal dimension than in a latitudinal dimension. The rear supporting portion distal arm 250 extends in a sagittal plane from a lateral aspect of the rear supporting portion second face 259. In the embodiment depicted, the rear supporting portion distal arm 250, rear supporting portion second face 259, and rear supporting portion first face 257 are configured as a monolith. However, the weight-supporting apparatus 205 may alternatively be configured such that the front planar portion 235, and rear supporting 255 or any combination thereof comprise separate and distinct components. As a non-limiting example, the rear supporting portion distal arm 250 may be configured as comprising a barrel hinge, piano hinge, a butterfly hinge or the like, so as to make the weight bearing apparatus 205 foldable or otherwise collapsible, and portable. The substantially l-shaped arm defined by the rear supporting portion second face 259 and rear supporting portion distal arm 250 is configured to facilitate engagement of the weight-supporting apparatus 205 with a framework of an upright exercise equipment apparatus by preventing disturbances or other jostling from dislodging the weight-supporting apparatus 205 therefrom. The depicted embodiment shows rear supporting portion 255 configured so that the rear supporting portion first face 257 and rear supporting portion second face 259 define parallel planar surfaces. However, the rear supporting portion 255 may be configured so that the rear supporting portion second face 259 defines various useful angles with the rear supporting portion first face 257, including angles within a preferred range of 0° and 45° relative to their shared lateral axis.

Exemplary Scale and Sensor Circuitry

FIG. 5 illustrates exemplary scale and sensor circuitry configured according to various embodiments of the present disclosure. For example, scale and sensor circuitry 207 of FIG. 2 may be embodied as the exemplary scale and sensor circuitry shown and described with reference to FIG. 5.

Scale and sensor circuitry 207 is configured to obtain information on gross, net, tare, total, and/or bulk weight supported by a weight-supporting apparatus. Thus configured, scale and sensor circuitry 207 detects weight data pertaining to the loading and unloading of weights on a weight-supporting apparatus during the course of an exercise regimen, thereby allowing the weight data to be provided to remote devices or other weight-supporting apparatuses in order to facilitate accurate tracking of exercise regimens. In some embodiments, scale and sensor circuitry 207 is configured to detect the weight of an un-loaded weight-bearing component (e.g., a standard weight bar, an Olympic weightlifting bar, a trap bar, a yoke bar, a cambered bar, a Swiss bar, a curl bar, a carry bar, etc.). Returning to our earlier example, scale and sensor circuitry 207 may be configured to detect the weight of an un-loaded trap bar prior to Kelly's loading the bar with weight to perform her squat exercise regimen. When thus configured, scale and sensor circuitry 207 may, for example, detect a first weight loading event relating to Kelly's mounting of an un-loaded trap bar onto the weight-supporting apparatus. Scale and sensor circuitry 207 may thus be configured to interpret the corresponding weight data as indicative of an un-loaded weight-bearing component. That is to say that scale and sensor circuitry 207 is configured to analyze and rank discrete weight data and interpret a lowest weight data value as associated with a first weight loading event—and, correspondingly an un-loaded weight-bearing component. So, if Kelly is using a 45 lb. trap bar to perform her squat regimen, scale and sensor circuitry 207 is configured to interpret Kelly's mounting of the un-loaded trap bar as a first weight loading event. In turn, scale and sensor circuitry 207 detects 45 lbs. to be the weight of the un-loaded trap bar Kelly is using. Thus, in some embodiments weight data comprises tare weight data.

In one embodiment, scale and sensor circuitry 207 is further configured to detect a change in the weight supported by a weight-supporting apparatus. Returning to our example of Kelly's squat regimen, Kelly is performing squats with 205 lbs. of weight. Thus, after mounting the un-loaded trap bar onto the weight-supporting apparatus, Kelly proceeds to load various weights on opposing sides of the trap bar to achieve her desired exercise weight. Let us say she successively loads each opposing side with a 45 lb. weight, a 25 lb. weight, and a 10 lb. weight to achieve a total weight of 205 lbs. Scale and sensor circuitry 207 is thus configured to detect the incremental weight differences that occur each time Kelly loads weight onto the trap bar. For example, scale and sensor circuitry 207 may detect a second weight loading event and subsequent weight loading events related to Kelly's loading the trap bar. In another embodiment, scale and sensor circuitry 207 is further configured to combine weight data corresponding to an un-loaded weight-bearing component and weight data corresponding to a detected weight change to determine total weight data or net weight data. In still other embodiments, other weight data methods or logical processes may be used.

In one exemplary embodiment as depicted in FIG. 5, scale and sensor circuitry 207 comprises a six wire load cell (output wires and sense wires not shown). The six wire load cell comprises a network of four strain gauges, $R_1$, $R_2$, $R_3$, and $R_4$ (i.e., a bridge circuit). Strain gauges $R_1$, $R_2$, comprise a first voltage divider. Strain gauges $R_3$, $R_4$ comprise a second voltage divider. Scale and sensor circuitry 207 is configured such that excitation voltage $V_{EX}$, output wires, and sense wires are in parallel with one another. Scale and sensor circuitry 207 configured according to embodiments of the present disclosure may alternatively be configured using passive sensing elements. For example, one or more of the four resistive legs, $R_1$, $R_2$, $R_3$, and $R_4$ may alternatively comprise resistors. Thus, scale and sensor circuitry 207 may be embodied in multiple configuration types (e.g., quarter bridge, half-bridge, and full-bridge) as appropriate.

In various embodiments, scale and sensor circuitry 207 further comprises an integrated scale and integrated weight sensor. In these example embodiments, the integrated scale and integrated weight sensor may be configured as various integrated circuit structures including at least ASICs, FPGAs, and CPLDs. For example, an integrated scale and integrated weight sensor according to embodiments described herein may be configured as a SoC to achieve voltage and current monitoring for a battery charger interface, thus achieving portability of the weight-supporting apparatus.

FIG. 6 is a right perspective view of an un-loaded weight-supporting apparatus illustrating how scale and sensor circuitry that is otherwise not visible in other drawings may be embedded therein according to embodiments of the present disclosure. In the depicted embodiment, dashed lines indicate that various components of scale and senor circuitry configured according to embodiments described herein reside in or are otherwise disposed within the weight-supporting apparatus 205. In various embodiments, the weight-supporting apparatus defines a void configured to house scale and sensor circuitry. In some embodiments, platform landing portion 240A comprises an embedded force sensor 601 into which scale and sensor circuitry is integrated. For example, scale and sensor circuitry may comprise a flexible force sensor array. In these embodiments, platform landing portion 240A may comprise a load-bearing surface configured to facilitate the transmission of force, pressure, or another physical excitation parameter therethrough. Non-limiting examples of load-bearing surface materials which may comprise the platform landing portion 240A in such embodiments are piezoelectrics and elastomers.

In the depicted embodiment, force sensor 601, controller 610, strain gauge 615, and digital display 215 (described above with reference to FIG. 3) are each communicatively coupled one to another via a data transmitter 605. Once a heavy object is on the force sensor 601, it bends slightly and converts the electrical signal to the controller 610 which sends a signal to the strain gauge 615 which determines the resistance of the weight. Then the strain gauge 615 (i.e., the elastic portion of the strain gauge body) absorbs the pressure from the weight and the bridge circuit (described above with reference to FIG. 5) will produce a voltage output. The controller 610 is configured to communicate between force sensor 601 and strain gauge 615 to maintain system tolerances of the strain gauge. The bridge circuit is used to measure the overall change in resistance. Therefore, a preferred embodiment comprises a six wire load cell so it can correct any error of the weight. Then the digital display 215 will output the exact weight of the object.

Exemplary Remote Device

FIG. 7 is an exemplary schematic diagram of a remote device 700 structured according to embodiments of the present disclosure. Any of remote devices 230A-230C of FIG. 2 may be embodied by one or more computing devices, such as remote device 700 depicted in FIG. 7. The depicted remote device 700 includes a memory 701, a processor 705, input/output ("I/O") circuitry 710, communications circuitry 715, and one or more software applications such as weight data software 720 supported by the distributed network.

In some embodiments, the processor 705 (and/or co-processor or any other processing circuitry assisting or otherwise associated with the processor, including as described elsewhere herein with respect to analogous processor 211) may be in communication with the memory 701 via a bus for passing information among components of the remote device 700. The memory 701 may be non-transitory and may include, for example, one or more volatile and/or non-volatile memories. In other words, for example, the memory may be an electronic storage device (e.g., a computer readable storage medium). The memory 701 may be configured to store information, data, content, applications, instructions, or the like, for enabling the remote device 700 to carry out various functions in accordance with example embodiments of the present disclosure.

The processor 705 may be embodied in a number of different ways and may, for example, include one or more processing devices configured to perform independently. Additionally, or alternatively, the processor 705 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors. The processor may be further understood by analogy to the processor 211 described elsewhere herein.

In an example embodiment, the processor 705 may be configured to execute instructions stored in the memory 701 (which may be understood as analogous to memory 209 described elsewhere herein) or otherwise accessible to the processor. Alternatively, or additionally, the processor 705 may be configured to execute hard-coded functionality. As such, whether configured by hardware or software methods, or by a combination thereof, the processor 705 may represent an entity (e.g., physically embodied in circuitry) capable of performing operations according to an embodiment of the present disclosure while configured accordingly. Alternatively, as another example, when the processor 705 is embodied as an executor of software instructions, the instructions may specifically configure the processor 705 to perform the algorithms and/or operations described herein when the instructions are executed.

The communications circuitry 715 may be any means such as a device or circuitry embodied in either hardware or a combination of hardware and software that is configured to receive and/or transmit data from/to a network and/or any other device, circuitry, or module in communication with the remote device 700. In this regard, the communications circuitry 715 may include, for example, a network interface for enabling communications with a wired or wireless communication network. For example, the communications circuitry 715 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some example embodiments where a remote device 700 is a mobile device, such as a smartphone, tablet, or smartwatch, (and thus embodied as any of remote devices 230A-C described elsewhere with reference to FIG. 2) the remote device 700 may execute a weight data software application 720 supported by the distributed network and database platform to interact with network 220 (shown in FIG. 2). Such software applications or "apps" are typically designed to execute on mobile devices, such as smartphones, tablets or smartwatches. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the remote device 700 may interact with the network 220 via a web browser. As yet another example, the remote device 700 may include various hardware or firmware designed to interface with the network 220.

In the depicted embodiment, the remote device 700 is configured, via the processor 705 and using data and instructions provided by the weight data software 720, to receive one or more instances of weight data or workout data via transmission over network 220 from server 225, both shown in FIG. 1. For example, remote device 700 may be a third-party device (e.g., a smartwatch such as remote device 230A shown in FIG. 2) that is associated with a user of the exercise system described herein and configured receive weight data associated with particular exercise regimens completed by the user.

FIG. 8 a right perspective view of an un-loaded weight-supporting apparatus structured according to embodiments of the present disclosure. In various embodiments, the front planar portion 235 and the platform 240 comprise a monolith. In some embodiments, the monolith comprising the front planar portion 235 and the platform 240 further comprises two interjoining or interlocking components that are permanently joined or affixed together by a joining means such as a weld or seam, for example. In certain embodiments, the front planar portion and the platform together define a substantially j-shaped façade. Thus, in the depicted embodiment the platform 240 defines a descender (i.e., a portion descending below a substantially planar surface of the front planar portion 235) of the substantially j-shaped facade. In some embodiments, the platform 240 comprises a monolith. In the depicted embodiment, the platform landing portion 240A defines a substantially lateral protrusion or extension from and therebetween an inferior aspect of the front planar portion 235 and the platform securing portion 240B. The platform 240 terminates with the platform securing portion 240B. In the depicted embodiment, the platform securing portion 240B defines a vertical angle of approximately 120° therewith the platform landing portion 240A.

In various embodiments, the front planar portion 235 is engaged, fastened, securely joined, or otherwise mechanically coupled to the rear supporting portion 255 by planar portion fastening means 261A. Planar portion fastening means 261A extends in a transverse plane from a cranial aspect of the front planar portion 235, near to a medial point thereof, through to the posterior side 257B. Engaging component 245, described in greater detail above with reference to FIG. 3, originates from near to a medial point of posterior side 257B that is inferior to 261A. Rear supporting portion distal arm 250 and rear supporting portion second face 259 together define a substantially l-shaped bracket. The substantially l-shaped bracket defined by rear supporting portion distal arm 250 and rear supporting portion second face 259 originates near to an inferior, distal aspect of the weight-supporting apparatus 205. Rear supporting portion second face 259 further comprises a posterior side 259A. In various embodiments, posterior side 259A comprises pads, cushions, bolsters or the like to facilitate engaging the weight-supporting apparatus 205 with upright exercise equipment apparatus.

FIG. 9A illustrates net weight data and total weight data for a properly loaded weight-supporting apparatus according to embodiments of the present disclosure. In the depicted embodiment, a first weight and a second weight each weighing 10 lbs. are loaded onto opposite ends of a 35-lb weight-bearing apparatus. Digital displays according to embodiments of the present disclosure are configured to display both total weight data and net weight data indicative of the loaded weight-bearing apparatus. Weight data indicative of the total (i.e., gross) weight of the weight-bearing apparatus and each 10-lb weight is displayed in a total weight data display 216C. The weight of the first weight is displayed in a left-side weight data display 216A. The weight of the second weight is displayed in a right-side weight data display 216B. Thus, the depicted embodiment is configured to visually indicate that the weight-bearing apparatus is properly (i.e., evenly) loaded. In various embodiments, the weight data 216 is arranged on a digital display according to a mapping. In some embodiments, the mapping is a natural mapping. For example, in the depicted embodiment weight data 216A corresponds to a weight loaded on a left side of a weight-bearing apparatus and correspondingly appears on a left side of the user interface of a digital display.

FIG. 9B illustrates net weight data and total weight data for an improperly loaded weight-supporting apparatus according to embodiments of the present disclosure. In the depicted embodiment, a first weight weights 5 lbs. A second weight weighs 10 lbs. Each is loaded onto an opposite end of a 35-lb weight-bearing apparatus. Digital displays according to embodiments of the present disclosure are configured to display both total weight data and net weight data indicative of the loaded weight-bearing apparatus. Weight data indicative of the total (i.e., gross) weight of the weight-bearing apparatus and each weight is displayed in a total weight data display 216C. The weight of the 5-lb. weight is displayed in a left-side weight data display 216A. The weight of the 10-lb. weight is displayed in a right-side weight data display 216B. Thus, the depicted embodiment is configured to visually indicate that the weight-bearing apparatus is improperly (i.e., unevenly) loaded.

Exemplary Operations

Having described the distributed network and exemplary scale and sensor circuitry comprising embodiments of the present disclosure, it should be understood that the weight-supporting apparatus 205 along with server 225 and remote devices 230A-C (shown in FIG. 2) and/or remote device 700 (shown in FIG. 7) may proceed to implement operational sequence sets in a number of ways.

In the embodiment illustrated in FIG. 10, an exemplary depicted process 1000 begins at Block 1005, which includes loading a first weight-bearing component onto a first weight-supporting apparatus. In some embodiments a weight-bearing component may be pre-loaded with weight. In other embodiments, the weight-bearing component may be loaded with weight after it is loaded onto the weight-supporting apparatus.

At Block 1010, the depicted process 1000 further includes viewing, on a digital display of the first weight-supporting apparatus, weight data detected by the integrated scale and integrated sensor of the first weight-supporting apparatus. In some embodiments, the weight data may comprise net weight data. For example, if our earlier exercise system user Kelly wants to see only the weight she is lifting, excluding the weight of the weight-bearing component. In other embodiments, the weight data may comprise gross weight data. In still other embodiments, the weight data may comprise bulk weight data.

At Block 1015, the depicted process 1000 further includes in response to viewing the weight data, adjusting a weight loaded on the first weight-bearing component. For example, Kelly views the weight data and realizes that Karen's exercise weight is too light. Kelly therefore adjusts the weight to suit her exercise regimen. The depicted process may conclude at Block 1015.

In the embodiment illustrated in FIG. 11, an exemplary depicted process 1100 begins at Block 1105, which includes prior to loading the first weight-bearing component onto the first weight-supporting apparatus, calibrating the first weight-supporting apparatus for a first user. In this case, Karen may need to unload the weight from the first weight-supporting apparatus to ensure that she remains within her physical limits. So, she proceeds to calibrate the weight-supporting apparatus to carefully track how she exerts herself.

At alternative Block 1106, the depicted process 1100 may include interacting with a user control of the integrated scale of the first weight-supporting apparatus to adjust the digital display so that it displays a zero weight in an un-loaded state. Karen may in fact need to manually zero the scale of the weight-supporting apparatus if for example, the digital display were presently displaying net weight data.

At alternative Block 1108, the depicted process 1100 may include confirming that the digital display of the first weight-supporting apparatus displays a zero weight in an un-loaded state. Thus, it may be necessary to only confirm tare weight data displayed by the digital display. The depicted process may conclude at either of alternative Block 1106 or alternative Block 1108.

In the embodiment depicted in FIG. 12, an exemplary depicted process 1200 begins at Block 1205, which includes prior to loading the first weight-bearing component onto the first weight-supporting apparatus, engaging the first J-Cup with an upright exercise equipment apparatus. In embodiments, weight-bearing apparatuses are removably engaged with an upright exercise equipment apparatus. So, Kelly may initially engage a weight-bearing apparatus with her upright exercise equipment before beginning her squat regimen.

At Block 1210, the depicted process 1200 further includes providing user input to a remote device. For example, Kelly interacts with her smartphone to initiate display of weight data regarding her exercise.

At Block 1215, the depicted process 1200 further includes in response to providing the user input, viewing weight data on a digital display of the first weight-supporting apparatus. Kelly may see that the weight is too light for her squats.

At Block 1220, the depicted process 1200 further includes unloading the first weight-bearing component from the first weight-supporting apparatus. Thus, Kelly removes the too light weights from the weight-supporting apparatus.

At Block 1225, the depicted process 1200 further includes loading a second weight-bearing component onto the first weight-supporting apparatus. Here, Kelly instead loads a heavier, more appropriate weight for her squat regimen.

At Block 1230, the depicted process 1200 further includes in response to loading a second weight-bearing component onto the first weight-supporting apparatus, viewing weight data on a digital display of the J-Cup. That is, Kelly double checks that her weight is right before exercising. The depicted process may conclude at Block 1230.

In the embodiment depicted in FIG. 13, an exemplary depicted process 1300 begins at Block 1305 which includes receiving, at the remote device, the weight data associated with the first weight-bearing component and the second weight-bearing component. Kelly decides to use her phone to track her exercise—including the weight that was too light.

At Block 1310, the depicted process 1300 further includes unloading the second weight-bearing component from the weight-supporting apparatus. Kelly begins to wrap up her workout.

At Block 1315, the depicted process 1300 further includes disengaging the weight-supporting apparatus from the upright exercise equipment. Kelly has finished and removes her weight-supporting apparatus to keep safe for another workout. The depicted process 1300 may conclude at Block 1315.

Particular embodiments of the subject matter have been described. However, other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. For example, a calibration method as described herein may be performed prior to use by a first user or subsequent thereto, but prior to use by a second user. In certain implementations, multitasking and parallel processing may be advantageous.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An exercise system comprising:
   at least one weight-supporting apparatus, the at least one weight-supporting apparatus being configured for use with an upright exercise equipment apparatus and for at least one of receiving or supporting a weight-bearing component, wherein the weight-bearing component is chosen from the group consisting of a standard weight bar, an Olympic weightlifting bar, a trap bar, a yoke bar, a cambered bar, a Swiss bar, a curl bar, and a carry bar, an integrated scale and an integrated weight sensor,
   a digital display configured to at least display a weight data detected by the integrated scale and the integrated weight sensor, the weight data including at least an indication of a weight supported on the at least one weight-supporting apparatus,
a distributed network, and
a server comprising a processor and one or more memory storage areas, the processor being configured to transmit the weight data over the distributed network to one or more remote devices, the one or more memory storage areas being configured to store the weight data on the server.

2. The exercise system of claim 1, wherein the at least one weight-supporting apparatus includes a first weight-supporting apparatus and a second weight-supporting apparatus, the second weight-supporting apparatus also being configured for use with the upright exercise equipment apparatus and for at least one of receiving or supporting the weight-bearing component.

3. The exercise system of claim 2, wherein the second weight-supporting apparatus further comprises:
a second integrated scale and a second integrated weight sensor, and
a second digital display configured at least to display second weight data detected by the second integrated scale and the second integrated weight sensor, the second weight data including at least the indication of the weight supported on the second weight-supporting apparatus.

4. The exercise system of claim 3, wherein the first weight-supporting apparatus and the second weight-supporting apparatus each further comprise a component for transmitting the weight data and receiving the weight data.

5. The exercise system of claim 4, wherein the weight data further comprises a weight change detected by the integrated weight sensor of at least one of the weight-supporting apparatus and the second weight-supporting apparatus.

6. The exercise system of claim 5, wherein transmitting the weight data comprises transmitting the weight change detected by the integrated weight sensor of the first and second weight-supporting apparatuses.

7. The exercise system of claim 5, wherein receiving the weight data comprises receiving, by the one or more remote devices, the weight change detected by at least one of the integrated scale or the second integrated scale of the first weight-supporting apparatus and the second weight-supporting apparatus, respectively.

8. The exercise system of claim 4, wherein transmitting the weight data at least comprises transmitting, from the first weight-supporting apparatus to the second weight-supporting apparatus, the weight data detected by the integrated scale and the integrated weight sensor of the first weight-supporting apparatus.

9. The exercise system of claim 4, wherein receiving the weight data at least comprises receiving, by the second weight-supporting apparatus from the first weight-supporting apparatus, the weight data detected by the integrated scale and the integrated sensor of the first weight-supporting apparatus.

10. The exercise system of claim 3, wherein the digital display of at least one of the first weight-supporting apparatus or the second weight-supporting apparatus is configured to display total weight data indicative of a total weight supported by both the first weight-supporting apparatus and the second weight-supporting apparatus.

11. The exercise system of claim 3, further comprising user controls integrated with at least one of the integrated scale or the second integrated scale of the first weight-supporting apparatus and the second weight-supporting apparatus, respectively, the user controls configured to permit user calibration of the integrated scale prior to placement of the weight bearing component upon at least one of the first or the second weight-supporting apparatus.

12. The exercise system of claim 3, wherein at least one of the first weight-supporting apparatus and the second weight-supporting apparatus further comprises a component for transmitting and receiving the weight data.

13. The exercise system of claim 2, wherein the first weight-supporting apparatus and the second weight-supporting apparatus are each removably engaged within the upright exercise equipment apparatus so as to be positioned opposite one another relative to the upright exercise equipment apparatus and to at least one of receive or support opposing ends of the weight-bearing component.

14. The exercise system of claim 1, wherein the one or more remote devices are configured for transmitting the weight data and receiving the weight data over the network and display of the weight data.

15. A method of using an exercise system, the method comprising the steps of:
loading a first weight-bearing component onto a weight-supporting apparatus, wherein the first weight-bearing component is chosen from the group consisting of a standard weight bar, an Olympic weightlifting bar, a trap bar, a yoke bar, a cambered bar, a Swiss bar, a curl bar, and a carry bar,
viewing, on a digital display of the weight-supporting apparatus, weight data detected by an integrated scale and an integrated sensor of the weight-supporting apparatus, and
in response to viewing the weight data, adjusting a weight loaded on the first weight-bearing component.

16. The method of claim 15, wherein either:
the weight-supporting apparatus comprises a single J-Cup assembly, or
the weight-supporting apparatus comprises a pair of J-Cup assemblies.

17. The method of claim 15, further comprising the step of:
prior to loading the first weight-bearing component onto the weight-supporting apparatus, calibrating the weight-supporting apparatus by:
(a) confirming that the digital display of the weight-supporting apparatus displays the weight data indicative of a zero-value weight in an un-loaded state, or
(b) interacting with a user control of the integrated scale of the weight-supporting apparatus to adjust the digital display so that it displays a zero weight in the un-loaded state.

18. The method of claim 15, further comprising the steps of:
prior to loading the first weight-bearing component onto the weight-supporting apparatus, engaging the weight-supporting apparatus with upright exercise equipment so as to facilitate at least one of receiving or supporting a weight-bearing component by the weight-supporting apparatus,
providing user input to a remote device,
in response to providing the user input, viewing the weight data on the digital display of the weight-supporting apparatus,
unloading the first weight-bearing component from the weight-supporting apparatus,
loading a second weight-bearing component onto the weight-supporting apparatus, and in response to loading the second weight-bearing component onto the weight-supporting apparatus, viewing the weight data on the digital display of the weight-supporting apparatus.

19. The method of claim 18, further comprising the steps of:
receiving, at the remote device, the weight data associated with the weight-bearing component and the second weight bearing component,
unloading the weight-bearing component from the weight-supporting apparatus, and
disengaging the weight-supporting apparatus from the upright exercise equipment.

* * * * *